United States Patent
Ellis, III et al.

(10) Patent No.: US 8,478,494 B2
(45) Date of Patent: Jul. 2, 2013

(54) MANUAL TRANSMISSION AND ENGINE SPEED MATCH USING A TRANSMISSION INPUT SHAFT SPEED SENSOR

(75) Inventors: John W. Ellis, III, Ann Arbor, MI (US); Paul C. Ong, Novi, MI (US); Dave Howe, Pinckney, MI (US); Bradford W. Bur, Clarkston, MI (US)

(73) Assignee: GM Global Technology Operations LLC

( * ) Notice: Subject to any disclaimer, the term of this patent is extended or adjusted under 35 U.S.C. 154(b) by 199 days.

(21) Appl. No.: 12/881,282

(22) Filed: Sep. 14, 2010

(65) Prior Publication Data

US 2012/0065851 A1    Mar. 15, 2012

(51) Int. Cl.
   *G06F 7/00*    (2006.01)

(52) U.S. Cl.
   USPC ............................. 701/54; 701/55; 477/70

(58) Field of Classification Search
   USPC .................. 701/54; 475/275, 278; 477/70
   See application file for complete search history.

(56) References Cited

U.S. PATENT DOCUMENTS

| 7,468,918 | B2 | 12/2008 | Dong et al. | |
| 7,894,964 | B2* | 2/2011 | Murayama et al. | 701/54 |
| 2009/0326771 | A1 | 12/2009 | Murayama et al. | |
| 2011/0295476 | A1* | 12/2011 | Ellis | 701/67 |

\* cited by examiner

*Primary Examiner* — Thomas Tarcza
*Assistant Examiner* — Tyler J Lee

(57) ABSTRACT

An engine speed matching system for a vehicle with a manual transmission includes a sensor that senses an input shaft speed of the manual transmission during a shift. A control module receives the input shaft speed, determines an engine speed, determines a desired engine speed based on the input shaft speed and the engine speed, and adjusts the engine speed based on the desired engine speed and the input shaft speed before the shift is completed.

15 Claims, 3 Drawing Sheets

US 8,478,494 B2

MANUAL TRANSMISSION AND ENGINE SPEED MATCH USING A TRANSMISSION INPUT SHAFT SPEED SENSOR

FIELD

The present disclosure relates to manual transmission systems and methods, and more particularly to engine speed matching in manual transmission systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In automotive vehicles having manual transmissions, a driver typically actuates a clutch pedal to disengage a clutch. With the clutch disengaged, the driver selects a desired transmission gear with a gear shifter. For example, the driver may select a higher gear (i.e. during an upshift) or a lower gear (i.e. during a downshift). When the gear shifter is in a position corresponding to the desired transmission gear, the driver releases the clutch pedal to reengage the clutch.

Generally, an engine speed before and/or during upshifts and downshifts is not equivalent to a speed of an input shaft of the transmission after the desired transmission gear is selected. For example, during a downshift, selecting a lower gear causes the speed of the input shaft to increase significantly. In contrast, with the clutch disengaged, the engine speed decreases significantly. Consequently, when the clutch is reengaged, the speed of the input shaft is significantly greater than the engine speed. The clutch is subjected to increased stress as a result of absorbing load associated with the difference between the engine speed and the input shaft speed, and driving feel is negatively affected. Similarly, during an upshift, the engine speed decreases significantly, and reengaging the clutch forces the clutch to absorb a load associated with the difference between the engine speed and the input shaft speed.

Some drivers may perform heel-toe shifting to mitigate effects of upshifting and downshifting (i.e. speed matching). For example, while decelerating rapidly with the clutch disengaged, a driver may apply the brake with an inner portion of the foot while simultaneously applying the accelerator with an outer heel portion of the same foot. With the clutch disengaged, relatively slight pressure on the accelerator causes a significant increase in the engine speed. When the desired transmission gear is selected and the clutch is reengaged, the engine speed may be more appropriately matched to the input shaft speed. However, driver initiated speed matching such as heel-toe shifting relies on driver skill and the ability of the driver to accurately predict the desired engine speed.

SUMMARY

An engine speed matching system for a vehicle with a manual transmission includes a sensor that senses an input shaft speed of the manual transmission during a shift. A control module receives the input shaft speed, determines an engine speed, determines a desired engine speed based on the input shaft speed and the engine speed, and adjusts the engine speed based on the desired engine speed and the input shaft speed before the shift is completed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
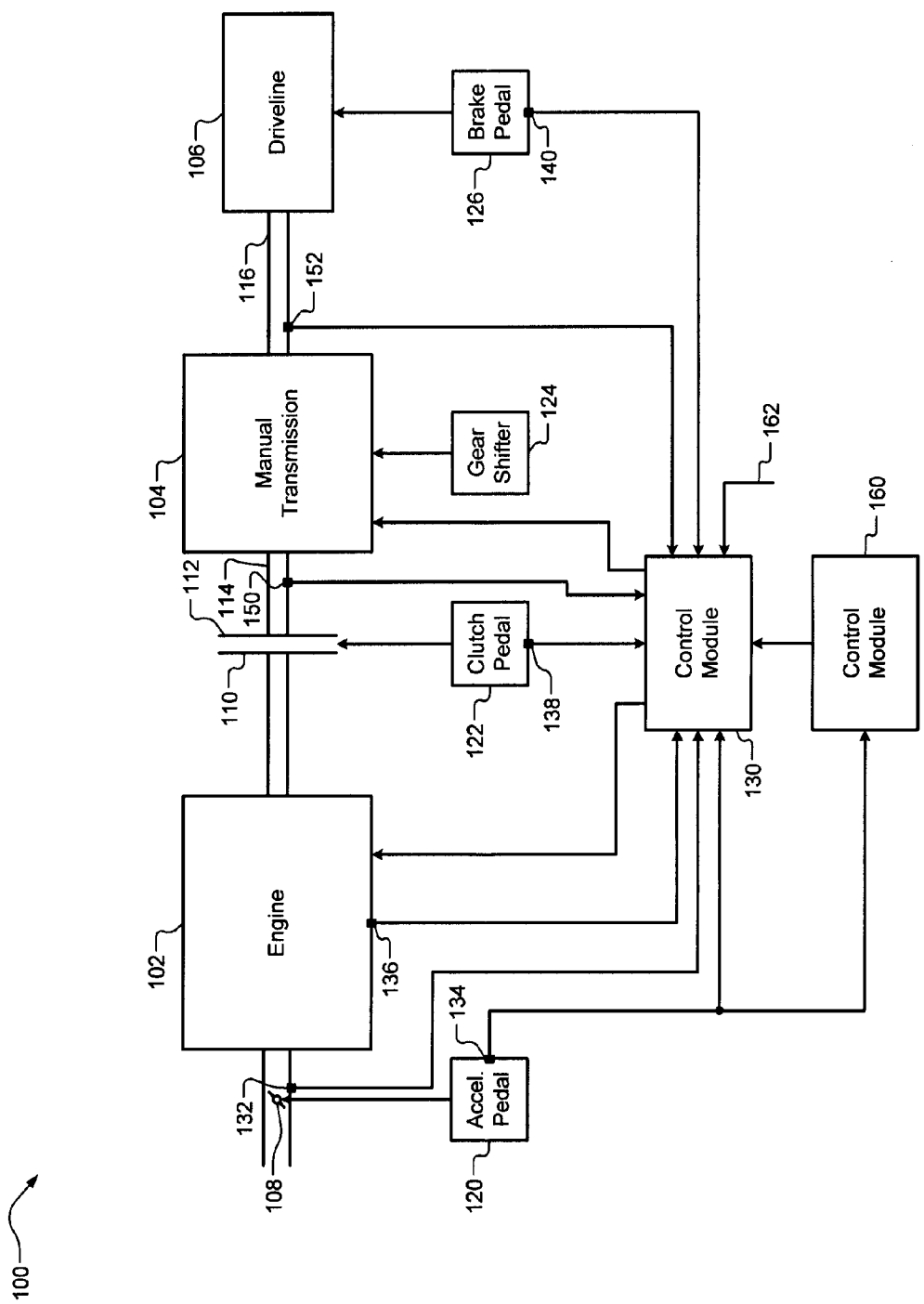
FIG. 1 is a functional block diagram of a vehicle according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine speed matching system of the present disclosure automatically matches an engine speed to a speed of an input shaft of a manual transmission. The engine speed matching system recognizes an intended shift and determines the input shaft speed. The engine speed matching system adjusts the engine speed based on the input shaft speed corresponding to the newly selected gear to improve clutch engagement, reduce load on the clutch, and improve shift feel regardless of driver skill.

Referring now to FIG. 1, a vehicle 100 includes an engine 102, a manual transmission 104, and a driveline 106. The driveline 106 includes, for example, a driveshaft and wheels (not shown) of the vehicle 100. The engine 102 receives fuel and air (via throttle 108) and produces rotational power to rotate a flywheel 110. The flywheel 110 transfers the rotational power to a clutch plate 112, thereby rotating an input shaft 114 of the manual transmission 104. The manual transmission 104 transfers the rotational power to the driveline 106 via an output shaft 116 based on a current selected gear.

The engine 102, manual transmission 104, and the driveline 106 are responsive to one or more driver inputs to control, for example, engine speed, the current selected gear, and braking. The throttle 108 controls airflow into the engine 102 based on a position of an accelerator pedal 120. A clutch pedal 122 selectively engages and disengages the clutch plate 112 from the flywheel 110. For example, when the clutch plate 112 is engaged with the flywheel 110, the rotational power is transferred to the manual transmission 104 via the input shaft 114. A position of a gear shifter 124 determines the current selected gear of the manual transmission 104. The driver initiates upshifts and downshifts by actuating the clutch pedal 122 to disengage the clutch plate 112 from the flywheel 110, selecting a desired gear with the gear shifter 124, and releasing the clutch pedal 122 to reengage the clutch plate 112 with the flywheel 110. The driver transfers braking energy to the driveline 106 (i.e. to the wheels of the driveline) using a brake pedal 126.

A control module 130 receives one or more inputs and controls one or more functions of the vehicle 100 based on the inputs. The control module 130 may be, for example, an engine control module (ECM). The control module 130 determines a throttle position based on a throttle position sensor (TPS) 132 and/or an accelerator pedal position sensor 134. The control module 130 determines an engine speed based on an engine speed sensor 136. The control module 130 determines when the driver initiates gear shifts based on a clutch pedal position sensor 138. The control module 130 determines whether the driver is braking based on a brake pedal position sensor 140.

The control module 130 communicates with the engine 102, the manual transmission 104, and the clutch pedal 122 to determine when the driver is initiating an upshift or a downshift, to determine a desired gear of the upshift or downshift, and to adjust torque output of the engine 102 to match the engine speed to the speed of the input shaft 114. For example, when the driver actuates the clutch pedal 122, the control module 130 determines that the driver is initiating a shift. The control module 130 communicates with the manual transmission 104 to determine the desired gear of the shift and, accordingly, what type of shift is being performed (i.e. whether the shift is an upshift or a downshift).

The control module 130 determines speeds of the input shaft 114 and the output shaft 116. For example, the control module 130 determines the speed of the input shaft 114 based on an input shaft speed sensor 150 and determines the speed of the output shaft 116 based on an output shaft speed sensor 152. The control module 130 determines the engine speed based on the engine speed sensor 136 and determines whether to adjust the engine speed to match the speed of the input shaft 114. For example, the control module 130 may command a torque increase to increase the engine speed to match the speed of the input shaft 114.

Other factors may determine how the control module 130 adjusts the engine speed. For example, the speed of the output shaft 116, the speed of the input shaft 114, and the desired engine speed may be affected based on whether the driver is accelerating or decelerating. Further, whether the driver is accelerating or decelerating may indicate whether the driver intends to accelerate or decelerate after the shift is complete. Accordingly, the control module 130 monitors the brake pedal position sensor 140 (e.g., prior to the shift) to determine whether the driver is braking (i.e. decelerating). For example only, braking before the shift may indicate a downshift. Similarly, the control module 130 monitors the accelerator pedal position sensor 134 (and/or the TPS 132) to determine whether the driver is pressing the accelerator pedal 120. In this manner, the control module 130 may determine whether the driver is accelerating (e.g. prior to the shift). For example only, accelerating before the shift may indicate an upshift. The control module 130 may consider whether the driver is accelerating or decelerating when adjusting the engine speed to match the speed of the input shaft 114.

The vehicle may include a second control module 160. For example, the control module 160 may be a body control module (BCM) or a chassis control module. The control module 160 communicates with the accelerator pedal position sensor 134 to determine whether the driver is pressing the accelerator pedal 120, and may disable the engine speed matching function of the control module 130 if the driver is pressing the accelerator pedal 120 during the shift. For example, if the driver is pressing the accelerator pedal 120 during the shift, the driver may be performing a heel-toe shift or another engine speed matching maneuver. Accordingly, the control module 160 disables the engine speed matching function of the control module 130 to prevent interference with the engine speed matching maneuver of the driver. Further, the vehicle 100 may include driver input 162 to allow the driver to disable the engine speed matching function of the control module 130.

Figure 2:
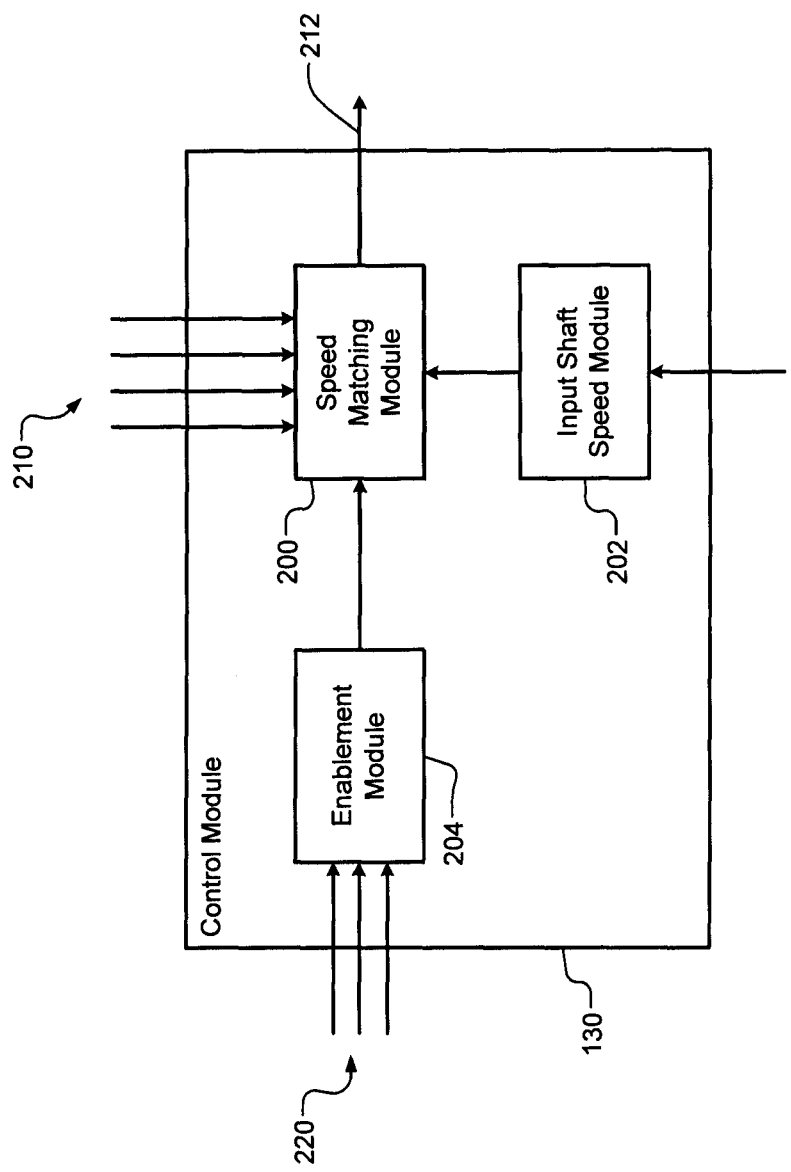
FIG. 2 is a functional block diagram of a control module according to the present disclosure.

Referring now to FIG. 2, the control module 130 includes a speed matching module 200, an input shaft speed module 202, and an enablement module 204. The input shaft speed module 202 communicates with the input shaft speed sensor 150 to determine a speed of the input shaft 114. The speed matching module 200 receives the speed of the input shaft 114 and one or more other signals 210 to calculate a speed or torque command 212. For example, the signals 210 may include, but are not limited to, accelerator pedal position before and during the shift, brake pedal position before and during a shift, output shaft speed, and engine speed. The speed matching module 200 calculates a desired engine speed to match the engine speed to the speed of the input shaft 114 based on the signals 210. The speed matching module 200 calculates the torque command 212 based on the desired engine speed.

The enablement module 204 may selectively enable and disable the speed matching module 200 based on one or more input signals 220. For example, the input signals 220 may include a clutch pedal position that indicates whether the driver is initiating a shift. The input signals 220 may further include a disable signal from the control module 160 and a disable signal from a driver input.

Figure 3:
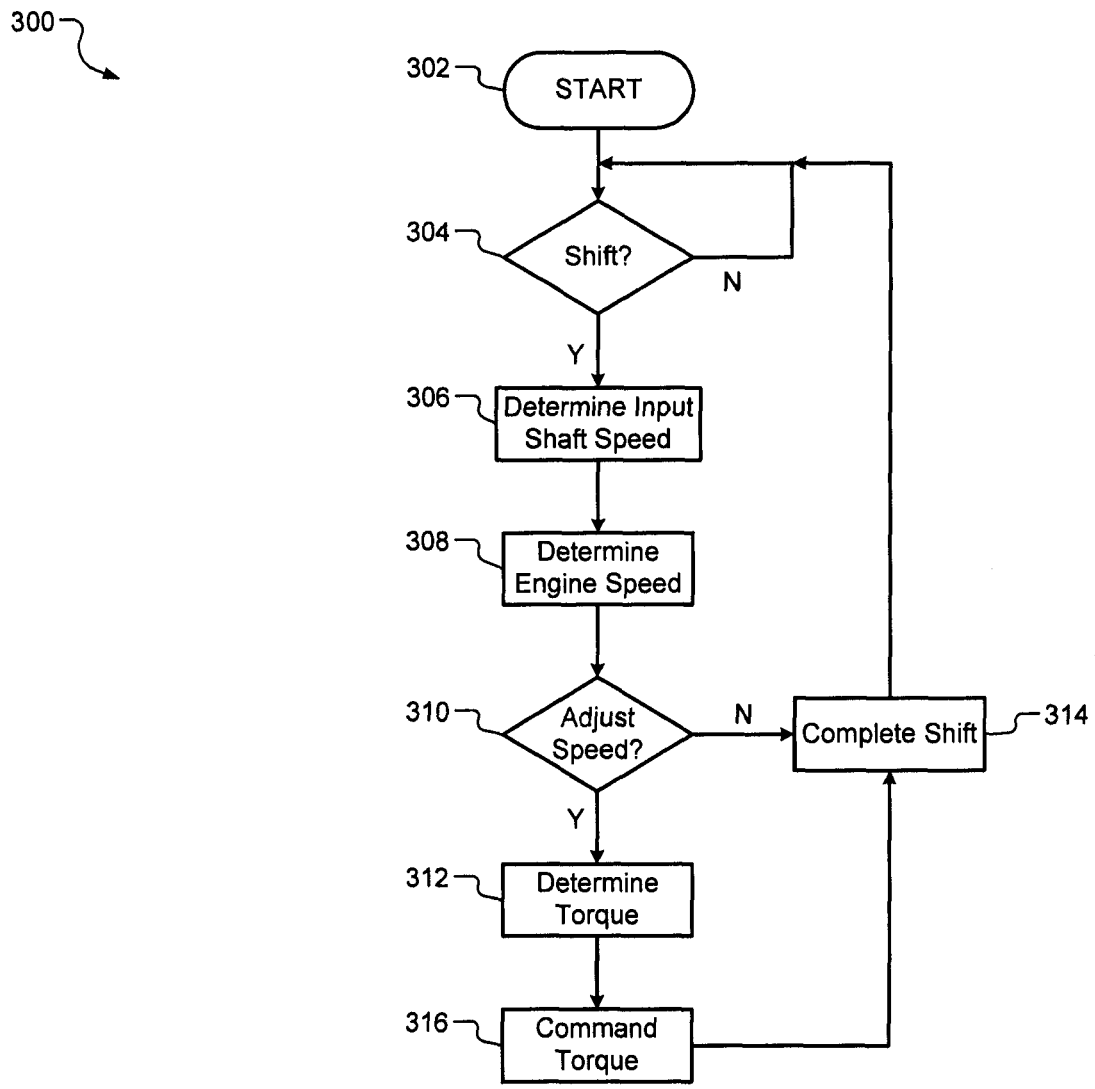
FIG. 3 illustrates steps of an engine speed matching method according to the present disclosure.

Referring now to FIG. 3, an engine speed matching method 300 begins in step 302. In step 304, the method 300 determines whether the driver is initiating a shift. For example, the method 300 may determine whether the driver is actuating the clutch pedal 122. If true, the method 300 continues to step 306. If false, the method 300 continues to step 304. In other words, the method 300 continuously monitors the clutch pedal 122 to determine whether the driver is initiating a shift.

In step 306, the method 300 determines inputs related to the shift and the speed of the input shaft 114. For example, the method 300 determines the type of shift, the desired gear, the brake pedal position, the speed of the output shaft 116, and the speed of the input shaft 114. In step 308, the method 300 determines the engine speed. In step 310, the method 300 determines whether to adjust the engine speed. The method 300 may determine whether to command a torque increase to adjust the engine speed based on the speed of the input shaft 114, the engine speed, and the accelerator pedal position. For example, if the driver is pressing the accelerator pedal, the method 300 may disable engine speed matching. If true, the method 300 continues to step 312. If false, the method 300 continues to step 314.

In step 312, the method 300 determines a speed or torque command based on the current engine speed, a desired engine speed, and the speed of the input shaft 114. In step 316, the method 300 commands the torque increase to increase the engine speed to the desired engine speed to match the speed of the input shaft 114. In step 314, the method 300 completes the shift and continues to step 304.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine speed matching system for a vehicle with a manual transmission, the engine speed matching system comprising:
    a sensor that senses an input shaft speed of the manual transmission during a shift; and
    a control module that receives the input shaft speed, that determines an engine speed, that determines a desired engine speed based on the input shaft speed and the engine speed, and that adjusts the engine speed based on the desired engine speed and the input shaft speed before the shift is completed,
    wherein the control module disables adjusting the engine speed based on the desired engine speed and the input shaft speed before the shift is completed in response to an accelerator pedal position during the shift.

2. The engine speed matching system of claim 1 wherein the control module further adjusts the engine speed based on at least one of an output shaft speed, the accelerator pedal position, and a brake pedal position.

3. The engine speed matching system of claim 2 wherein the control module determines whether the vehicle is accelerating based on the accelerator pedal position and the brake pedal position, and further adjusts the engine speed based on whether the vehicle is accelerating or decelerating.

4. The engine speed matching system of claim 1 wherein the control module receives a clutch pedal position and adjusts the engine speed when the clutch pedal position indicates that a driver is initiating the shift.

5. The engine speed matching system of claim 1 wherein adjusting the engine speed is disabled based on a driver input.

6. The engine speed matching system of claim 1 wherein the shift is completed when a clutch pedal is released.

7. The engine speed matching system of claim 1 wherein the control module commands torque based on the desired engine speed.

8. A vehicle comprising the engine speed matching system of claim 1.

9. An engine speed matching method for a vehicle with a manual transmission, the method comprising:
    sensing an input shaft speed of the manual transmission during a shift using a sensor;
    receiving the input shaft speed;
    determining an engine speed;
    determining a desired engine speed based on the input shaft speed and the engine speed;
    adjusting the engine speed based on the desired engine speed and the input shaft speed before the shift is completed; and
    disabling adjusting the engine speed based on the desired engine speed and the input shaft speed before the shift is completed in response to an accelerator pedal position during the shift.

10. The method of claim 9 further comprising adjusting the engine speed based on at least one of an output shaft speed, the accelerator pedal position, and a brake pedal position.

11. The method of claim 10 further comprising:
    determining whether the vehicle is accelerating or decelerating based on the accelerator pedal position and the brake pedal position; and
    adjusting the engine speed based on whether the vehicle is accelerating or decelerating.

12. The method of claim 9 further comprising:
    receiving a clutch pedal position; and
    adjusting the engine speed when the clutch pedal position indicates that a driver is initiating the shift.

13. The method of claim 9 wherein adjusting the engine speed is disabled based on a driver input.

14. The method of claim 9 wherein the shift is completed when a clutch pedal is released.

15. The method of claim 9 further comprising commanding torque based on the desired engine speed.

* * * * *